March 31, 1970 — R. G. PETRY ET AL — 3,503,091

FAST RESPONSE WINDSHIELD WASHER

Filed April 4, 1968 — 3 Sheets-Sheet 1

INVENTORS
Ronald G. Petry, &
Harry Kronson, Jr.
BY W. A. Schuetz
ATTORNEY

March 31, 1970 R. G. PETRY ET AL 3,503,091
FAST RESPONSE WINDSHIELD WASHER
Filed April 4, 1968 3 Sheets-Sheet 2

INVENTORS
Ronald G. Petry, &
BY Harry Kronson, Jr.
W. A. Schuetz
ATTORNEY

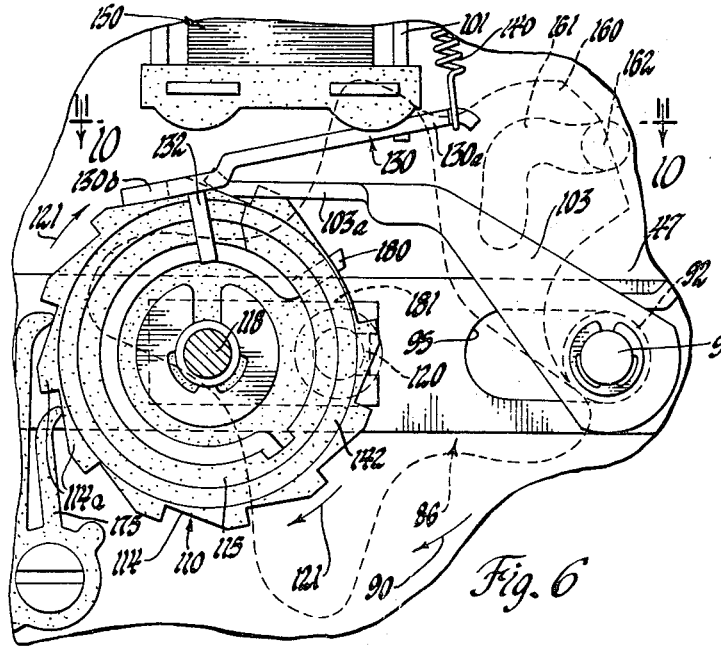

3,503,091
FAST RESPONSE WINDSHIELD WASHER
Ronald G. Petry, Dayton, and Harry Kronson, Jr., Kettering, Ohio, assignors to General Motors Corporation, Detroit, Mich., a corporation of Delaware
Filed Apr. 4, 1968, Ser. No. 718,843
Int. Cl. B60s 1/02; B05b 1/10
U.S. Cl. 15—250.02                    5 Claims

ABSTRACT OF THE DISCLOSURE

This disclosure relates to a windshield cleaning apparatus having a wiper unit including a wiper which is movable across the windshield in opposite directions between first and second positions during running operation and to a parked position upon termination of the running operation and a washer unit which is adapted to be operated conjointly with the wiper unit. The washer unit includes a washer pump assembly having an interruptible driving connection with a drive motor of the wiper unit. The washer pump assembly comprises a reciprocally movable pumping member which is spring actuated through its discharge stroke and which is cam actuated through its intake stroke. The pumping member is normally held against movement through its discharge stroke by a lockout means or cam and with the spring being in a charged condition. The lockout means is adapted to be moved to release the pumping member for movement through its discharge stroke in response to movement of the wiper from its parked position to its first position so that a charge of washing fluid is applied to the windshield prior to the start of the running operation of the wiper.

---

The present invention relates to a windshield cleaning apparatus, and more particularly to a windshield cleaning apparatus having a wiper unit including a wiper which is movable across the windshield in opposite directions between first and second positions during running operation and to a depressed parked position upon termination of the running operation and a washer unit which is adapted to be operated conjointly with the wiper unit.

A general object of the present invention is to provide a new and improved windshield cleaning apparatus of the character referred to, and in which the washer unit is operable to supply a squirt of washing fluid onto the windshield in response to movement of the wiper from its parked position to its first position so that washing fluid is applied to the windshield prior to the start of the running operation of the wiper to eliminate or minimize streaking of the windshield during the first or first couple of strokes of the wiper during running operation.

One type of washer unit commonly employed for conjoint operation with a wiper unit having a depressed park capability includes a washer pump assembly having a reciprocally movable pumping member movable through intake and discharge strokes. The pumping member has an interruptible driving connection with a drive means drivingly connected with the drive motor for the wiper unit. The pump, when conjoint operation of the washer unit is effected, is spring actuated through its discharge stroke and is moved through its intake stroke by the drive means. The washer pump assembly also includes a lockout means or cam for normally holding the pumping member against movement through its discharge stroke and which has interruptible driving connection with the drive means. A selectively operable control means is provided to establish a driving connection between the lockout cam and the drive means to cause the same to be moved from its lockout position to release the pump for movement through its discharge stroke and to thereafter interrupt the driving connection therebetween.

The present invention is an improvement over windshield cleaning apparatuses employing these known type washer unit in that the pumping member of the washer pump is released for movement through its discharge stroke by the spring in response to movement of the wiper from its parked position to its first position. This enables the washer pump to deliver a charge of washing fluid onto the windshield prior to the start of the running operation of the wiper so that streaking of the windshield during the first stroke of the wiper is substantially minimized or prevented.

Accordingly, a more specific object of the present invention is to provide a new and improved windshield cleaning apparatus of the type referred to above and in which the pump member is released for movement through its discharge stroke by the spring in response to movement of the wiper from its parked position to its position at the start of the running operation whereby cleaning fluid is applied to the windshield prior to the start of the running operation of the wiper.

Yet another object of the present invention is to provide a new and improved windshield cleaning apparatus of the type referred to above and in which the drive means includes a cam follower means having an interruptible driving connection with the lockout means or cam and which is movable through work and return strokes, the cam follower means being operable to engage the lockout means and move the same to a release position during movement through its work stroke upon being drivingly connected therewith, and a multilobe rotatable cam for moving the cam follower means through its work stroke and for permitting movement of the latter through its return stroke, and in which the cam is drivingly connected with the drive motor of the wiper motor in a manner such that when the wiper is moved from its parked position to its first position the cam is caused to first rotate in a first direction to permit the cam follower means to move through its return stroke and effect a drive connection between the cam follower means and the lockout means and then to rotate in the opposite direction to move the lockout means to a release position in which it allows the spring to move the pump member through its discharge stroke.

The present invention further resides in various novel constructions and arrangement of parts, and further objects, novel characteristics and advantages of the present invention will be apparent to those skilled in the art to which it relates and from the following detailed description of the preferred embodiment thereof made with reference to the accompanying drawings forming a part of this specification and in which similar reference numerals or characters are employed to designate corresponding parts throughout the several view, and in which:

FIGURE 1 of the drawings is a fragmentary perspective view of a vehicle embodying the novel windshield cleaning apparatus of the present invention;

FIGURE 6 is an enlarged view similar to that shown in FIGURE 2, but showing certain parts thereof in different positions;

FIGURE 7 is an enlarged fragmentary sectional view taken approximately along line 7—7 of FIGURE 3;

FIGURES 8 and 9 are views similar to that shown in FIGURE 7, but showing the parts thereof in different positions;

FIGURE 10 is an enlarged fragmentary sectional view taken approximately along line 10—10 of FIGURE 6;

FIGURE 11 is an enlarged fragmentary sectional view taken approximately along line 11—11 of FIGURE 2; and FIGURE 12 is a sectional view taken approximately along line 12—12 of FIGURE 2.

Figure 1:
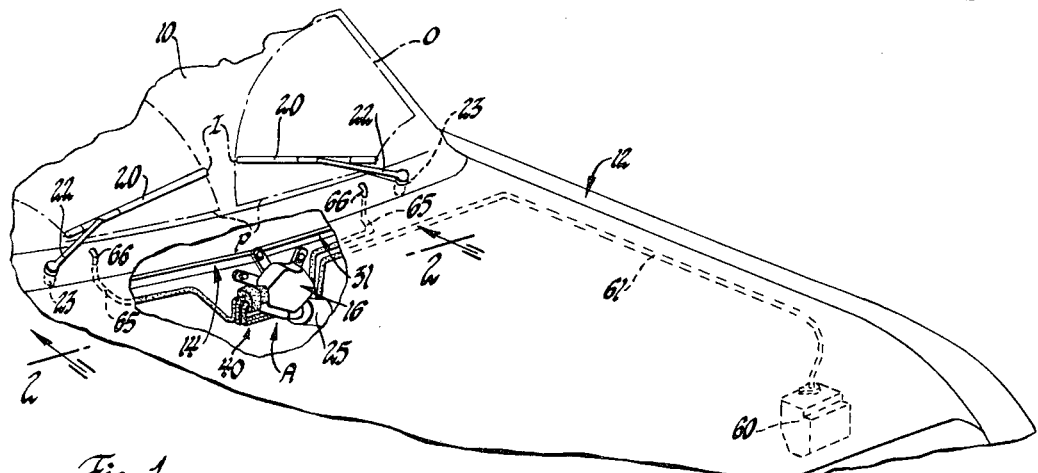

As representing a preferred embodiment of the present invention, FIGURE 1 of the drawings shows a windshield cleaning apparatus A for cleaning a windshield 10 of an automotive vehicle 12. The windshield cleaning apparatus A broadly comprises a wiper unit 14 for wiping the windshield and a programmed washer unit 16 for delivering intermittent squirts of cleaning fluid onto the windshield and which is adapted to be operated conjointly in timed relationship with the wiper unit for a predetermined number of wiper strokes.

The wiper unit 14 comprises a pair of wipers or wiper blades 20 which are adapted to be moved in arcuate paths across predetermined areas of the windshield 10. The wiper blades 20 during running operation move across the windshield in opposite directions between inboard and outboard positions, as respectively designated by the letters I and O in FIGURE 1, and are adapted to be moved to a depressed parked position P spaced from the inboard position I when running operation of the wiper blade is terminated.

The wiper blades are carried by oscillatable wiper arms 22 drivingly connected to oscillatable drive pivots 23 carried by the vehicle at spaced locations adjacent the lower edge of the windshield 10. The drive pivots 23 are adapted to be oscillated by a drive mechanism which includes an electric wiper motor 25 connected via a gear reduction unit 26 to a unidirectional drive sleeve 27 (see FIGURE 3). The gear reduction unit 26 includes a worm 26a (see FIGURE 2) fixed to the output shaft of the motor 25 and a helical gear 26b fixed to the sleeve 27. Eccentrically and rotatably mounted within the drive sleeve 27 is a drive shaft 28 to which a crank arm 29 is affixed. A suitable clutch mechanism, designated generally by reference numeral 30, for drivingly interconnecting and disconnecting the sleeve 27 and the shaft 28 is provided to enable the sleeve 27 to be rotated relative to the shaft 28 and move the shaft 28 to vary the throw of the crank 29 and move the wiper blades between their inboard position I and their parked position P. The crank arm 29 is drivingly connected with the oscillatable drive pivots 23 by a suitable linkage arrangement 31 to oscillate the drive pivots 23, which in turn causes the wiper arms and blades to be oscillated across the windshield between their inboard and outboard positions I and O, respectively.

Since the manner in which the drive sleeve 27 and drive shaft 28 are clutched and declutched together and relatively rotated to effect movement of the wiper blades between their inboard position I and their parked position P does not per se form a part of the present invention, it will not be described in detail. Suffice it to say that the drive sleeve 27 and drive shaft 28 are declutched when the drive motor 25 is initially energized to permit the drive sleeve 27 to rotate relative to the drive shaft 28 to decrease the throw of the crank arm 29 and move the wiper blades 20 from their parked position P to their inboard position I, as shown schematically in FIGURE 1, and then automatically clutched together to oscillate the blades 20 between their inboard and outboard positions during running operation. When running operation is terminated the wiper blades 20 are in their inboard position I, the drive sleeve 27 is declutched from the drive shaft 28 and then rotated a predetermined angular extent relative to the drive shaft 28 to increase the throw of the crank arm 29 and move the wipers from their inboard position I to their depressed park position P. For a complete description of the structure and operation of the eccentric parking arrangement, resort may be had to U.S. Patent No. 3,253,206.

Figure 2:
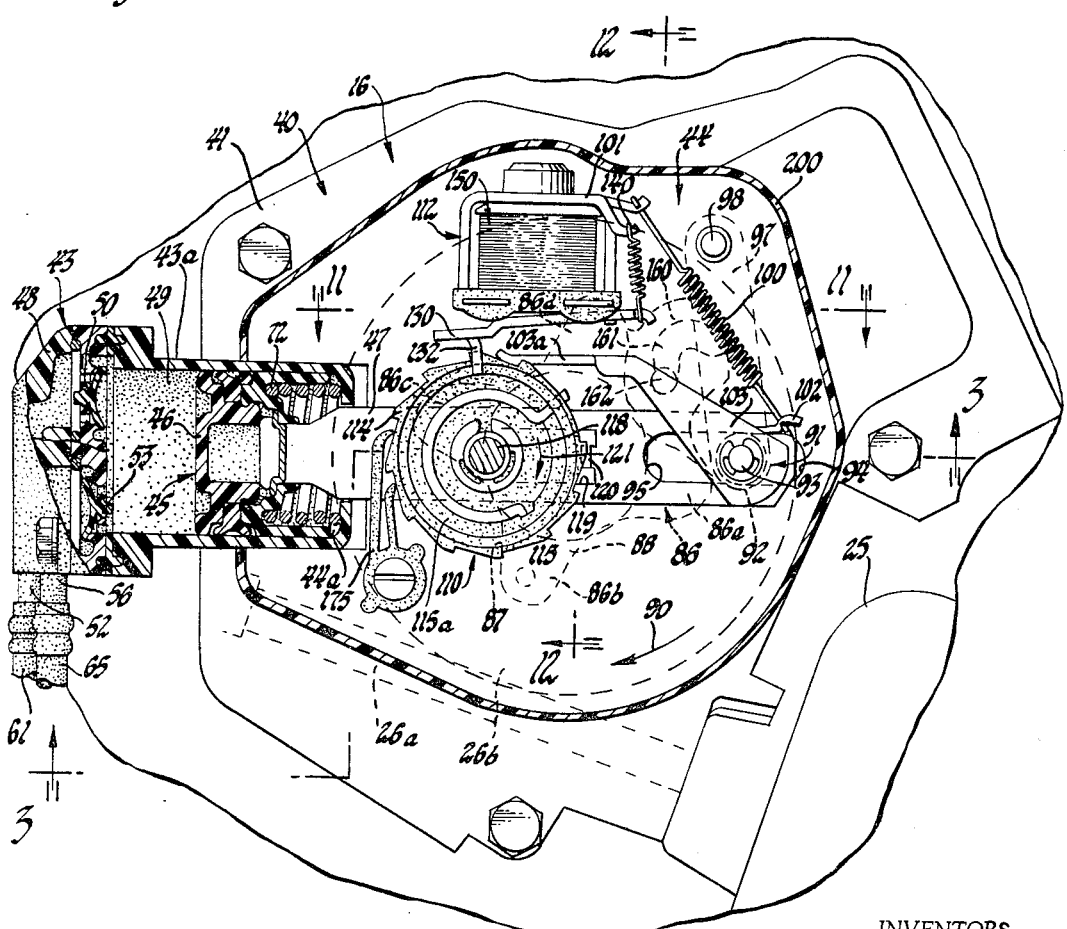
FIGURE 2 is an enlarged fragmentary sectional view of part of the windshield cleaning apparatus of the present invention and taken approximately along line 2—2 of FIGURE 1.
Figure 3:
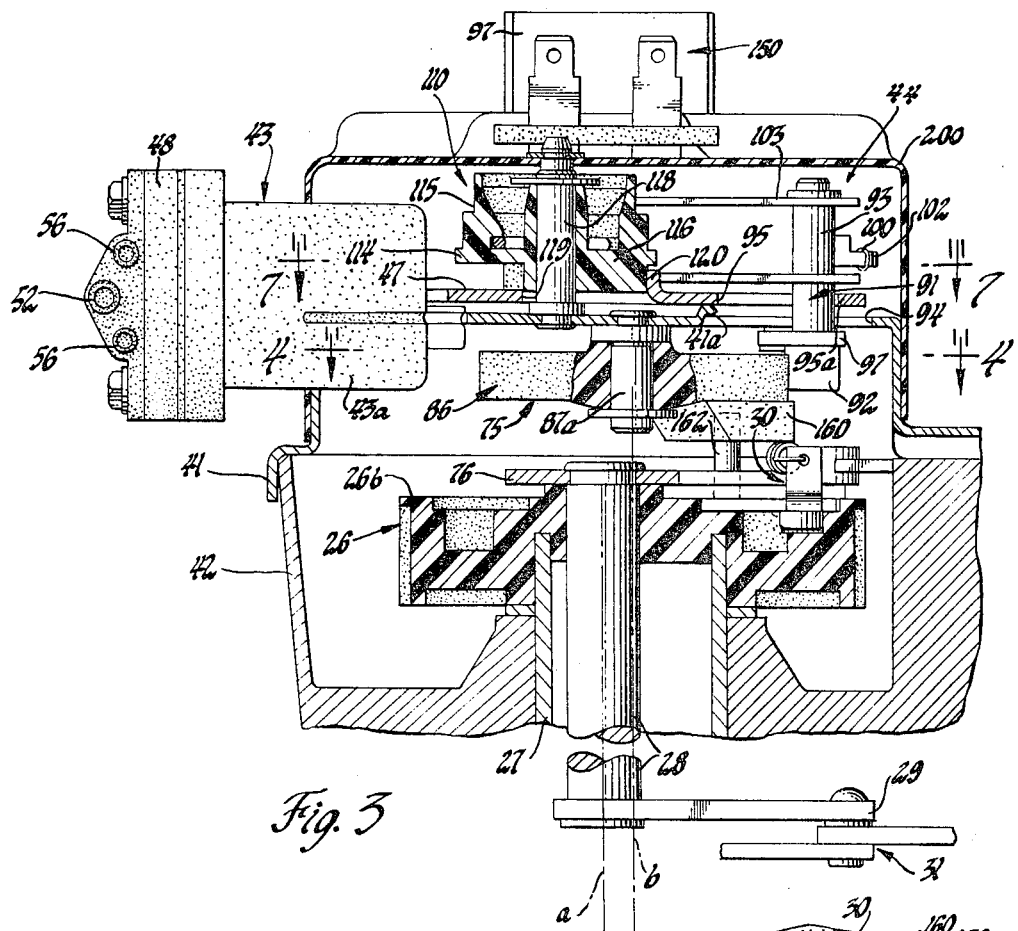
FIGURE 3 is a fragmentary sectional view taken approximately along line 3—3 of FIGURE 2.

The washer unit 16 is adapted to be operated conjointly with the wiper unit 14 and comprises a washer pump assembly 43 for intermittently providing squirts of washing fluid to be applied to the windshield 10. The washer pump assembly 43 is best shown in FIGURES 2 and 3 and comprises, in general, a support means or frame 41 which is suitably secured to a housing 42 containing the gear reduction unit 26, a washer pump 43 carried by the frame 41 and which has an interruptible driving connection with the drive motor 25, and a control mechanism 44 which is operable to establish a driving connection between the pump 43 and the wiper unit motor 25 for a predetermined number of wiper strokes and then to automatically interrupt the driving connection therebetween.

The washer pump 43 comprises a plastic pump housing 43a secured to the support frame 41 and a reciprocably movable plunger or plunger means 45 slidably received within the housing 43a. The plunger 45 includes a piston 46 and a pump rod 47 having one end connected with the piston 46 and the other end extending rearwardly, i.e., toward the right as viewed in FIGURES 2 and 3, beyond the adjacent rearward end 44a of the housing 43a. The pump rod 47 adjacent its rearward end is slidably supported by a tab or flange 41a of the frame 41. The pump 43 also includes a valve chamber part 48 secured to the housing 43a at its forward end remote from the rod 47 and which defines with the piston 46 a chamber 49. The valve chamber part 48 contains an inlet check valve 50 for controlling communication between an inlet nipple 52 and the chamber 49 and a pair of outlet check valves 53 for controlling communication between the chamber 49 and a pair of outlet nipples 56.

The plunger 45 is adapted to be reciprocably moved through intake and discharge strokes. When the plunger 45 is moved through its intake stroke, toward the right as viewed in FIGURES 2 and 3, washing fluid is drawn from a reservoir 60 (see FIGURE 1) via conduit 61, inlet nipple 52 and past the check valve 50 into the chamber 49. When the plunger 45 is moved through its discharge stroke, toward the left as viewed in FIGURES 2 and 3, the washing fluid in the chamber 49 is forced under pressure past the outlet check valves 53, nipples 56 and conduits 65 to a pair of nozzles 66 mounted on the vehicle 12 adjacent the wiper blades 20. The fluid delivered to the nozzles 66 is emitted in jet form and directed toward designated areas on the windshield 10 located in a path of movement traversed by the wiper blades 20.

The plunger 45 is moved through its discharge stroke by a compression spring 72 encircling the pump rod 47 and having one end in abutting engagement with the end wall 44a of the housing 43a and the other end in abutting engagement with the piston 46 at its side opposite the chamber 49. The compression spring 72 biases the plunger 45 toward engagement with the valve chamber part 48.

Figure 4:
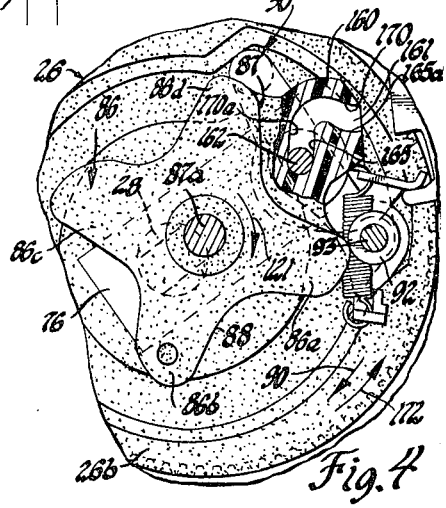
FIGURE 4 is a fragmentary sectional view taken approximately along line 4—4 of FIGURE 3.

The plunger 45 is adapted to be moved through its intake stroke in opposition to the biasing force of the compression spring 72 by a drive means 75 when the washer unit 16 is placed in operation. As best shown in FIGURE 3, the drive means 75 comprises a crank arm 76 having one end fixed to the shaft 28 at its end opposite that to which the crank arm 29 is fixed. The crank arm 76 at its end remote from the shaft 28 is drivingly connected with a multilobed cam 86 rotatably supported by a stub shaft 87a secured to the support frame 41, and in a manner which will be hereinafter more fully described. The multilobed cam 86 is located adjacent the gear reduction unit 26 and, in the preferred embodiment, is provided with four equally spaced lobes 86a–86d. Each lobe of the cam 86 has a rise portion 87 and a fall portion 88. The cam 86 is adapted to be rotated in the direction of the arrow 90 in FIGURES 2, 4 and 5 when the crank arm 76 and shaft 28 are rotated, which occurs during running operation of the wiper blades 20.

The drive means 75 further includes a cam follower means 91 for moving the plunger 45 through its intake stroke and which has a lost motion drive connection with the plunger 45 to enable the drive connection therebetween to be interrupted. The cam follower means 91 includes a cam follower member 92 which rides in peripheral engagement with the cam 86 and which is fixed on the lower end of a drive member or pin 93, as viewed in FIGURE 3. The drive pin 93 projects upwardly through aligned elongated slots 94 and 95 in the frame 41 and the pump rod 47, respectively, and is connected intermediate its ends to one end of a support lever 97. The other end of the support lever 97 is pivotally connected to the support frame 41 by a pivot pin 98 (see FIGURE 2).

As best shown in FIGURE 2, the cam follower member 92 is biased into peripheral engagement with the cam 86 by a tension spring 100 having one end connected with an armature frame 101 secured to the frame 41 and the other end connected with an ear 102 on a drive pawl 103 which is pivotally connected to the upper end portion of the drive pin 93. The armature frame 101 and the drive pawl 103 comprise part of the control mechanism 44, as will hereinafter be more fully described.

The cam 86, when the cam follower means 91 is drivingly connected with the pump rod 47, functions to move the plunger 45 through its intake stroke and then permits the spring 72 to move the plunger 45 through its discharge stroke. When the plunger 45 is at the end of its intake stroke, the cam follower member 92 will be engaged with the high point of the rise portion 87 of one of the lobes of the cam 86, the lobe 86a as shown in FIGURE 2, and the drive pin 93 will be in engagement with the pump rod 47 at the rearward end 95a of the slot 95, as shown in FIGURES 2 and 3. As the cam 86 is rotated in the direction of the arrow 90, the compression spring 72 moves the plunger 45 through its discharge stroke to deliver a charge of washing fluid to the windshield 10 and the pump rod 47 and spring 100 move the cam follower member 92 along the fall portion 88 of the lobe 86a of the cam 86 until the follower member 92 engages the low point thereof. When in this position the plunger 45 will have completed its discharge stroke. Continued rotation of the cam 86 causes the rise portion 87 of the next lobe 87b thereof to engage the cam follower member 92 and move the same toward the right, as viewed in FIGURES 2 and 3. As the cam follower roller 92 moves toward the right the drive pin 93, which remained in engagement with the pump rod 47 at the rearward end 95a of the slot 95, is moved through its work stroke to move the pump rod 47 toward the right in opposition to the biasing force of the spring 72. During this movement of the plunger 45, it is moved through its intake stroke in which washing fluid is drawn from the reservoir 60 into the chamber 49 and the spring 72 is compressed or charged. The intake stroke is completed when the member 92 is at the high point of the rise portion 87 of the lobe 87b of the cam 86. Further rotation of the cam 86 causes the next pumping cycle to be initiated.

The control mechanism 44 is operable to establish a driving connection between the drive pin 93 of the cam follower means 91 and the plunger 45 of the pump 43 for a predetermined number of wiper strokes and then to automatically, abruptly interrupt the driving connection therebetween after the predetermined number of wiper strokes have been completed. The control mechanism 44 does not per se form a part of the present invention, and is the subject matter of copending patent application Ser. No. 701,443, filed Jan. 29, 1968, and assigned to the same assignee as the present invention. Therefore, the control mechanism 44 will only be described to the extent necessary for a full understanding of the present invention.

The control mechanism 44, in general, includes a wiper stroke counting means in the form of an indexible ratchet cam assembly 110 for controlling operation of the pump 43 and which in turn has an interruptible driving connection with the drive pawl 103 pivotally connected to the drive pin 93 of the cam follower means 91. The control mechanism 44 also includes a control means 112 which is operable, when momentarily energized by the operator, to establish a drive connection between the ratchet cam assembly 110 and the drive pawl 103 and which cooperates with the ratchet cam assembly 110 to automatically disconnect the drive connection therebetween upon the latter being rotated one complete revolution.

As best shown in FIGURE 3, the ratchet cam assembly 110 includes a plastic ratchet wheel 114 having a drum 115 and a cam 116 formed integral with its upper and lower sides, respectively. The ratchet cam assembly 110 is rotatably supported on a stub shaft 118 which is secured to the support frame 41 and which extends through a second elongated slot 119 in the pump rod 47, the slot 119 enabling the pump rod 47 to be reciprocated relative to the shaft 118.

The ratchet cam assembly 110 is normally disconnected from the drive pawl 103 and disposed in a stop position, as shown in FIGURES 6 and 7, in which it interrupts the driving connection between the plunger 45 of the pump 43 and the cam follower means 91. When in this position, the cam 116 engages a lug or tab 120 on the pump rod 47 to hold the plunger 45 against movement through its discharge stroke by the spring 72 and the spring 72 in a charged condition. The provision of the slot 95 in the pump rod 47 allows the drive pin 93 to move relative to the pump rod 47. The cam 116 is generally wedge shaped and, in the illustrated embodiment, has abrupt rise and fall portions 116a and 116b which extend generally radially of the ratchet wheel 114 and a stepped circumferentially extending dwell portion 116c. When the ratchet cam assembly 110 is in its stop position, the outermost step of the dwell portion 116c is in engagement with the lug 120.

The ratchet cam assembly 110 is adapted to be intermittently, rotatably indexed in the direction of the arrow 121 by the drive pawl 103 when the latter is drivingly connected therewith. To this end, the ratchet wheel 114 has a plurality of circumferentially spaced teeth 114a and the pawl 103, which is continuously moved toward and from the ratchet wheel 114 by the drive pin 93 when the cam 86 is rotated, has an end portion 103a which extends generally tangential of the ratchet wheel 114 and which is provided with a tooth receiving window or slot 103b. The end portion 103a of the pawl is biased toward engagement with the periphery of the ratchet wheel 114 by the spring 100 and its free end is adapted to hook behind the adjacently located tooth 114a on the ratchet wheel 114 when the pawl 103 is moved toward the ratchet wheel 114 and to index the ratchet cam assembly 110 in the direction of the arrow 121 when moved away from the ratchet wheel 114.

Although the drive pawl 103 is continuously moved toward and from the ratchet wheel 114 by the drive pin 93 of the cam follower means 91, it is normally prevented from engaging and indexing the ratchet cam assembly 110 by an armature or control element 130 of the control means 112. The armature 130 is located adjacent the periphery of the ratchet wheel 114 and is suitably, pivotally supported at one end portion 130a thereof by the armature frame 101 for movement both radially and axially of the ratchet wheel 114. The armature 130 at its other end 130b is generally J-shaped to define a slot 131 through which the drive pawl 103 may pass and it has a finger or flange 132 extending transversely of the plane of the armature and generally radially of the ratchet cam assembly 110. The shorter leg of the J-shaped end portion 130b defines a ramp portion or surface 135 which is adapted to be engaged by the end 103a of the drive pawl 103 to prevent the latter from hooking behind the adjacent tooth on the ratchet wheel 114.

The armature 130 is biased by a tension spring 140 toward a first or normal position, as shown in FIGURES 6 and 10 in which the finger 132 engages the upper end 115a of the drum 115 and extends radially inwardly thereof and in which the ramp 135 is disposed in the path of movement of the drive pawl 103 so as to prevent the same from hooking behind and drivingly engaging the adjacent tooth on the ratchet wheel 114. The spring 140 has one end connected to the end portion 130a of the armature and its other end connected with the armature frame 101. The spring 140 functions to bias the armature 130 in directions both downwardly toward the ratchet wheel 114, as viewed in FIGURE 3, and radially inwardly of the drum 115.

The armature 130 is movable from its first or normal position, as shown in FIGURE 6, to a second position, as shown in FIGURES 2, 11 and 12, in which it is positioned such that it permits the end portion 103a of the pawl 103 to engage the hook behind the adjacent tooth on the ratchet wheel 114 to index the same. When the armature 130 is in its second position, the finger 132 is engaged with the outer periphery of the drum 115 and in engagement with an annular radially extending surface 142 at the lower end of the drum 115, as best shown in FIGURE 11, and the ramp surface 135 is located out of the path of movement of the drive pawl 103. The finger 132 serves to hold the armature 130 in a position which is radially spaced from the periphery of the ratchet wheel 114, as best shown in FIGURES 2 and 12, so as to enable the drive pawl 103 to drivingly engage the ratchet teeth 114a.

The armature 130 is movable from its first position toward its second position in response to momentary energization of an electromagnet means 150 and via the tension spring 140. The electromagnet means 150 is carried by the armature frame and functions when momentarily energized to draw the armature 130 radially away from the periphery of the ratchet wheel 114 to an intermediate position in which it is in engagement with the electromagnet means 150. When the electromagnet means is then de-energized the spring 140 will pivot the armature 130 downwardly from its intermediate position toward the ratchet wheel 114 until the finger 132 is in engagement with the annular surface 142 and radially inwardly against the drum 115.

The washer unit 16 can be operated conjointly with the wiper unit 14 either initially when a wiping action is desired or subsequently after wiping action has been commenced. The wiper unit 14 is energized by energizing the wiper motor 25 and the washer unit is actuated by momentarily energizing the electromagnet means 150. Operation of the washer unit 16 and the wiper unit 14 are adapted to be controlled by suitable electric control circuits which include a suitable switch means mounted on the vehicle in a position which is readily accessible to the operator. Since the switch means and the electric control circuits for controlling operation of the wiper and washer units do not per se form a part of the present invention and could be of any suitable or conventional construction, they have not been shown in the drawings and will not be described in detail.

In accordance with the provisions of the present invention the pump 43 is operable to supply a squirt of washing fluid onto the windshield in response to movement of the wiper blades 20 from their parted position P to their inboard position I. This is effected, in the preferred embodiment, by providing a novel drive connection between the shaft 28 of the wiper unit 14 and the rotatable cam 86 of the washer unit 16. To this end, the rotatable cam 86 has a boss portion 160 on its underside provided with a generally radially extending C-shaped groove or slot 161 and the crank arm 76 at its end remote from the shaft 28 carries a drive pin 162 which is slidably received within the C-shaped groove 161.

Figure 5:
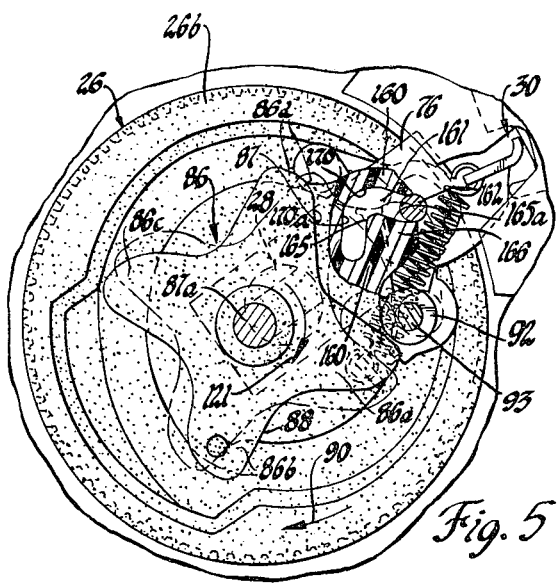
FIGURE 5 is a view similar to that shown in FIGURE 4, but showing certain parts thereof in different positions.

Since the drive mechanism of the wiper unit 14 always parks the blades 20 in the same position and since the cam 86 is driven in timed relationship with the drive mechanism, the cam follower member 92, when the wiper blades 20 are in their parked position P, is always in engagement with the fall portion 88 of the lobe 86a of the cam 86 (see FIGURES 5 and 6). The fall portion 88 of the lobe 86a is a planar radially extending surface Also, when the blades 20 are in their parked position, the drive pin 162 is disposed at the outer end of the groove 161, as shown in FIGURE 5.

When operation of the washer unit 16 is desired along with the wiper unit 14, the operator will manually manipulate the switch means (not shown) to simultaneously effect energization of both the drive motor 25 and the electromagnet means 150. Energization of the electromagnet means 150 causes the control armature 130 to be moved from its first or normal position, as shown in FIGURES 6 and 10, to its second position as shown in FIGURES 2, 11 and 12, in which position it permits the drive pawl 103 to drivingly engage the adjacent tooth 114a on the ratchet wheel 114 when moved theretoward.

Energization of the drive motor 25 causes the drive sleeve 27 to be rotated relative to the drive shaft 28 a predetermined angular extent prior to the clutch mechanism 30 functioning to clutch the drive sleeve 27 and shaft 28 together to rotate as a unit. During this relative movement, the axis of the shaft 28 is shifted radially relative to the sleeve 27, since the drive shaft 28 is eccentrically disposed within the drive sleeve 27, the extent of the shift, as viewed in FIGURE 3, being indicated by the letters a and b. This decreases the throw of the crank 29 and causes the wiper blades 20 to be moved from their parked position P to their inboard position I.

Simultaneously, the throw of the crank arm 76 is decreased a like amount, which causes the drive pin 162 to be moved radially inwardly relative to the cam 86. As the drive pin 162 moves radially inwardly relative to the cam 86, it first engages a side surface portion 165a of the side wall 165 of the C-shaped groove 161, the surface portion 165a extending across or transversely of the radial path of movement of the pin 162. This engagement causes the cam 86 to be rotated in the direction of arrow 90 toward the phantom line position shown in FIGURE 5. Rotation of the cam 86 in this direction allows the spring 100 to move the cam follower means 91 radially inwardly along the fall portion 88 of the lobe 86a from the solid line position toward the dotted line position shown in FIGURE 5, and the drive pawl 103 toward the ratchet wheel 114. As the drive pawl 103 moves toward the ratchet wheel 114 it will engage the adjacently located tooth 114a and hook behind the same.

As the drive pin 162 continues to move radially inwardly of the cam 86 it disengages the surface portion 165a and engages a surface portion 170a of the opposite side wall 170 of the C-shaped groove 161. The drive pin 162 upon engaging the opposite side wall surface portion 170a causes the cam 86 to be rotated in the opposite direction, as indicated by the arrow 172, and toward the solid line position shown in FIGURE 5. Rotation of the cam 86 in this direction causes the cam follower means 91 to be cammed radially outwardly toward the solid line position shown in FIGURE 5. Movement of the cam follower member 92 toward this position causes the drive pawl 103 to be moved through its work stroke and causes the ratchet cam assembly 110 and hence, the cam 116 to be indexed in the direction of the arrow 121 from its normal position, as shown in FIGURE 7, to a release position in which the dwell portion 116c of the cam 116 is disengaged from the tab 120 on the pump rod 47. When the dwell portion 116c of the cam 116 disengages the tab 120, the spring 72, which was held in a charged condition, moves the plunger 45 through its discharge stroke to apply a squirt of washing fluid onto the windshield 10. During movement of the plunger 45 through its discharge stroke the cam follower member 92 is moved inwardly along the fall portion 88 of the lobe 86a of the cam 86 toward the dotted line position shown in FIGURE 5 as a result of the pump rod 47 at the rearward end 95a of the slot 95 engaging the drive pin 93 when being moved by the spring 72. This causes the drive pawl 103 to hook behind the next tooth 114a of the ratchet wheel 114.

It should be noted that this initial squirt of washing fluid is discharged against the windshield 10 prior to the wiper blades 20 reaching their inboard position I. This insures that the windshield is wetted prior to starting running operation of the wiper blades and hence, minimizes or prevents streaking of the windshield during the first wiper stroke of the blades across the windshield.

When the wiper blades have reached their inboard position I, the drive sleeve 27 and shaft 28 are clutched together so as to cause the wipers to be oscillated across the windshield. At the same time the crank arm 76 is rotated, which causes the cam 86 through the drive pin 162 to be rotated in the direction of the arrow 90.

As the cam 86 is rotated in the direction of the arrow 90, the plunger 45 is alternately moved through its intake strokes in which washing fluid is drawn into the chamber 49 from the reservoir 60 and discharge strokes in which the washing fluid is squirted against the windshield 10 and in the path of movement of the wiper blades 20, and in a manner hereinbefore described.

The number of ratchet teeth 114a provided, in the illustrated embodiment, is twelve and the angular extent it is indexed during each indexing movement is 30°, the ratchet wheel 114 being indexed 30° in the direction of the arrow 121 during the intake strokes of each cycle of operation of the pump 47. As the ratchet wheel 114 is indexed, the finger 132 rides on the annular surface 142 at the lower end of the drum 115. This operation continues through ten indexing movements. To insure against any reverse rotation of the ratchet wheel, a suitable antibacklash lever 175 carried by the frame 41 and engageable with the ratchet teeth 114a is provided.

On the 11th indexing movement of the ratchet cam assembly 110, the rise portion 116b of the cam 116 will move into the path of movement of the lug 120 on the pump rod 47. As best shown in FIGURE 8, as the plunger 45 is being moved through its intake stroke, toward the right as viewed in FIGURE 8, the lug 120 on the rod 47 will engage the rise portion 116a of the cam 116 and interfere with the indexing movement of the ratchet wheel 114. The engagement between the lug 120 on the pump rod 47 and the rise portion 116a of the cam 116 occurs during the latter portion of the eleventh indexing movement of the ratchet wheel 114.

To preclude any jamming action between the lug 120 and the rise portion 116a of the cam 116 which could cause breakage of the parts, the ratchet wheel 114 is provided with a flexible tooth 180 which is engaged by the drive pawl 103 during the eleventh indexing movement. The flexible tooth 180 yields, i.e., moves relative to the ratchet wheel 114, to allow the lug 120 on the pump rod 47 upon engaging the rise portion 116a of the cam 116 to clear the latter and then functions to rotate the ratchet cam assembly 110 through the remaining portion of the eleventh indexing movement to position the lower step of the dwell portion 116c in front of the lug 120 on the pump rod 47, as shown in FIGURE 9, to prevent the plunger 45 from being moved through its discharge stroke upon completion of this intake stroke. This interrupts the driving connection between the pump rod 47 and the cam follower means 91, and with the latter now moving relative to the pump rod 47 due to the provision of the slot 95 in the pump rod 47, which slot provides a lost motion connection therebetween.

The flexible tooth 180 is, in the illustrated embodiment, in the form of a U-shaped spring carried within the drum 115 and which has one end securely attached to the annular wall of the drum and its other or tooth end extending through a circumferentially extending slot 181 in the side wall of the ratchet wheel 114. The spring bias is such that the tooth end is normally biased into engagement with the ratchet wheel 114 at the leftmost end of the slot 181, as best shown in FIGURE 6, and is disposed midway between two adjacent rigid teeth. The tooth end projects radially outwardly an extent equal to the radial extent of the other teeth 114a. The flexible tooth 180 is of sufficient stiffness to enable the drive pawl 103 to rotate the ratchet cam assembly 110 during the 11th indexing movement until the rise portion 116a of the cam 116 interferes with the lug 120 of the pump rod 47. When this interference takes place, the drive pawl 103, which continues to move away from the ratchet wheel 114, causes the tooth 180 of the U-shaped spring to yield and move in the slot 181 in the direction of the arrow 121 relative to the ratchet wheel 114 and in opposition to the biasing force of the spring. When the lug 120 on the pump rod 47 clears the rise portion 116a of the cam 116 at the end of the intake stroke of the plunger 45, the biasing force of the spring 180 causes the ratchet wheel 114 to be rotated through the remaining portion of this indexing movement such that the lower step of the dwell portion 116c of the cam 116 is disposed in front of the lug 120 on the pump rod 47. When this occurs, the driving connection between the pump rod 47 and the cam follower means 91 is interrupted, since the plunger 45 cannot be moved through its discharge stroke by the spring 72.

The driving connection between the pawl 103 and the ratchet wheel 114 is automatically interrupted on the next or 12th indexing movement of the ratchet wheel 114. To this end, the drum portion 115 is provided with a sharply rising cam surface 190 extending from the annular surface 142 to the end wall 115a of the drum 115. As the ratchet wheel 114 is rotatably indexed through its 12th indexing movement, the finger 132 engages the cam surface 190 and is cammed upwardly, as viewed in FIGURE 10 toward the outer end wall 115a of the drum 115 in opposition to the biasing force of the spring 140 until the finger 132 clears the end wall 115a whereupon the spring 140 will snap or move the armature 130 to its first or normal position, as shown in FIGURE 6. When in this position the ramp surface 135 will be disposed in the path of movement of the end 103a of the pawl 103 such that when the pawl 103 is moved toward and from the ratchet wheel 114 it engages the ramp surface 135 and is held away from the ratchet teeth on the ratchet wheel 114.

Also, during the last or 12th indexing movement of the ratchet wheel 116 the lug 120 on the pump rod 47 is cammed from the lower stepped surface onto the outer stepped surface of the dwell portion 116c of the cam 116. This further charges the spring 72 and positions the slot 95 of the pump rod 47 such that the drive pin 93, which moves within the slot during the wiper operation, will not engage the pump rod 47 at the rearward end 95a of the slot 95 and thereby prevent any clicking noise. To prevent any dirt, etc., from coming into engagement with the washer pump assembly 40, a suitable removable cover 200 attached to the frame 41 is provided.

Although the illustrated embodiment thereof has been described in great detail, it should be apparent that certain modifications, changes, and adaptations may be made in the illustrated embodiment, and that it is intended to cover all such modifications, changes and adaptations which come within the scope of the invention.

What is claimed is:

1. A windshield cleaning apparatus for cleaning a windshield of a vehicle comprising: a wiper unit having a wiper for wiping the windshield and a drive mechanism for moving the wiper across the windshield between first and second positions during running operation of the wiper unit and for moving the wiper to a parked position spaced from said first position when running operation of the wiper is terminated and from the parked position to the first position when wiper unit operation is initiated, a washer unit adapted to be operated conjointly with the wiper unit and including a washer assembly which is operable to deliver a charge of washing fluid under pressure to the windshield prior to the start of the running operation of said wiper, said washer pump assembly comprising a washer pump having a movable pumping member normally held in a charged condition, and means responsive to movement of said wiper from its parked position toward said first position for releasing said pumping member for movement to deliver a charge of washing fluid to said windshield.

2. A windshield cleaning apparatus for cleaning a windshield of a vehicle comprising: a wiper unit having a wiper for wiping the windshield and a drive mechanism for moving the wiper across the windshield between first and second positions during running operation of the wiper unit and for moving the wiper to a parked position spaced from said first position when running operation of the wiper is terminated and from the parked position to the first position when wiper unit operation is initiated, a washer unit adapted to be operated conjointly with the wiper unit and including a washer pump assembly which is operable to deliver a charge of washing fluid under pressure against the windshield prior to the start of the running operation of said wiper, said washer pump assembly comprising a washer pump having a pumping member movable in opposite directions through intake and discharge strokes and which has an interruptible driving connection with said drive mechanism, biasing means for moving the pumping member through its discharge stroke, said drive mechanism being effective to move said pumping member through its intake stroke in opposition to the biasing force of said biasing means when drivingly connected with said pumping member, first means supported for movement relative to said pumping member and being normally disposed in a first position in which it is engageable with said pumping member to hold the same against movement through its discharge stroke and to retain the biasing means in a charged condition, and second means which is operable to effect movement of said first means from said first position to disengage said pumping member in response to movement of said wiper blade from its parked position toward said one position to allow said biasing means to move said pumping member through its discharge stroke whereby washing fluid will be discharged onto the windshield prior to the start of the running operation of the wiper.

3. A windshield cleaning apparatus for cleaning a windshield of a vehicle comprising: a wiper unit having a wiper for wiping the windshield and a drive mechanism for moving the wiper across the windshield in opposite directions between first and second positions during running operation of the wiper unit and for moving the wiper to a parked position spaced from said first position when running operation of the wiper is terminated and from the parked position to the first position when wiper unit operation is initiated, a washer unit adapted to be operated conjointly with the wiper unit and including a washer pump assembly which is operable to deliver a charge of washing fluid under pressure to the windshield prior to the start of the running operation of said wiper, said washer pump assembly including a washer pump having a pumping member movable in opposite directions through intake and discharge strokes, spring means for moving the pumping member through its discharge stroke, a drive means drivingly connected with said drive mechanism of said wiper unit and having an interruptible driving connection with said pumping member, lockout means supported for movement relative to said pumping member and being normally disposed in a first position in which it is engageable with said pumping member to hold the same against movement through its discharge stroke and to retain the spring means in a charged condition, said drive means including a cam follower means movable through work and return strokes and having an interruptible driving connection with said lockout means and a rotatable cam for moving said cam follower means through its work stroke, control means operable to establish a driving connection between said cam follower means and said lockout means to effect movement of the latter from its first position when the former is moved through its work stroke, said drive means including a member connected with said drive mechanism and cooperably engageable with said rotatable cam to drivingly connect the latter with said drive mechanism and to effect rotation of said rotatable cam in a first direction to allow said cam follower means to move through its return stroke and then to effect rotation of said rotatable cam in a second opposite direction to move said cam follower means through its work stroke and move said lockout means from its first position in response to movement of said wiper from its parked position to said one position.

4. A windshield cleaning apparatus as defined in claim 3 wherein said cam has a generally radially extending, C-shaped groove and said member is a pin connected with an eccentrically supported variable throw crank arm of said drive mechanism, said crank arm effecting movement of said pin radially of said cam in response to movement of said blades from their parked position to their first position and said C-shaped groove defining a pair of wall surfaces which are sequentially engageable by said pin as said pin is moved radially of said cam to cause said cam to be sequentially moved in said first and second directions.

5. A washer unit for delivering washing fluid to a windshield of an automotive vehicle comprising: a washer pump assembly including a washer pump having a pumping member movable in opposite directions through intake and discharge strokes, spring means for moving the pumping member through its discharge stroke, drive means for moving said pumping member through its intake stroke and having an interruptible driving connection with said pumping member, lockout means supported for movement relative to said pumping member and being normally disposed in a first position in which it is engageable with said pumping member to hold the same against movement through its discharge stroke and to retain the spring means in a charged condition, said drive means including a cam follower means movable through work and return strokes and having an interruptible driving connection with said lockout means and a rotatable cam for moving said cam follower means through its work stroke, control means operable to establish a driving connection between said cam follower means and said lockout means to effect movement of the latter from its first position when the former is moved through its work stroke, said cam having a generally radially extending, C-shaped groove and said drive means also including a member slidably disposed in said groove and which is radially movable relative to said cam, said C-shaped groove defining first and second radially spaced wall surfaces which are sequentially engageable by said member as the latter is moved radially relative to said cam to cause said cam to be sequentially moved in first and second directions, said cam when moved in said first direction allowing said cam follower means to move through its return stroke and when moved in said second direction effecting movement of said cam follower means through its work stroke to move said lockout means from its first position and allow said spring means to move said pumping member through its discharge stroke.

References Cited

UNITED STATES PATENTS

| | | | |
|---|---|---|---|
| 2,878,505 | 3/1959 | Ziegler | 15—250.02 |
| 2,905,962 | 9/1959 | Ziegler | 15—250.02 |
| 2,925,618 | 2/1960 | Ziegler | 15—250.02 |
| 2,936,476 | 5/1960 | Ziegler | 15—250.02 |
| 2,959,803 | 11/1960 | Ziegler | 15—250.02 |
| 3,078,492 | 2/1963 | Oishei et al. | 15—250.02 |

PETER FELDMAN, Primary Examiner

U.S. Cl. X.R.

15—250.16

PO-1050
(5/69)

UNITED STATES PATENT OFFICE
CERTIFICATE OF CORRECTION

Patent No. 3,503,091　　　　　　　　Dated April 20, 1970

Inventor(s) Ronald G. Petry and Harry Kronson, Jr.

It is certified that error appears in the above-identified patent and that said Letters Patent are hereby corrected as shown below:

Column 11, line 20, "washer assembly" should read
-- washer pump assembly --.

SIGNED AND
SEALED
AUG 18 1970

(SEAL)
Attest:

Edward M. Fletcher, Jr.
Attesting Officer

WILLIAM E. SCHUYLER, JR.
Commissioner of Patents